US008917334B2

(12) United States Patent
Takeuchi

(10) Patent No.: US 8,917,334 B2
(45) Date of Patent: Dec. 23, 2014

(54) IMAGE DETECTION DEVICE, FOCUSING DEVICE, IMAGE-CAPTURING DEVICE, IMAGE DETECTION METHOD, AND FOCUSING METHOD

(75) Inventor: Hiroshi Takeuchi, Tokyo (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 13/137,282

(22) Filed: Aug. 3, 2011

(65) Prior Publication Data

US 2011/0292274 A1 Dec. 1, 2011

Related U.S. Application Data

(63) Continuation of application No. 12/216,688, filed on Jul. 9, 2008, now abandoned.

(30) Foreign Application Priority Data

Jul. 9, 2007 (JP) ................................ 2007-179210

(51) Int. Cl.
*H04N 5/262* (2006.01)
*G03B 13/36* (2006.01)
(52) U.S. Cl.
CPC ...................................... *G03B 13/36* (2013.01)
USPC ................ 348/240.99; 348/240.1; 348/240.2; 348/240.3
(58) Field of Classification Search
None
See application file for complete search history.

(56) References Cited

U.S. PATENT DOCUMENTS

| 5,659,816 | A | 8/1997 | Uchiyama | |
|---|---|---|---|---|
| 7,423,669 | B2 * | 9/2008 | Oya et al. ................. | 348/208.14 |
| 7,469,099 | B2 * | 12/2008 | Terayama ..................... | 396/123 |
| 7,602,417 | B2 * | 10/2009 | Ogasawara et al. ........... | 348/169 |
| 7,683,963 | B2 * | 3/2010 | Huang ............................ | 348/348 |
| 7,791,646 | B2 * | 9/2010 | Nishikawa ................. | 348/211.9 |
| 2005/0018879 | A1 * | 1/2005 | Ito et al. ........................ | 382/103 |
| 2007/0019104 | A1 * | 1/2007 | Inoue et al. ................... | 348/345 |
| 2009/0225188 | A1 * | 9/2009 | Miyao et al. ............... | 348/223.1 |
| 2010/0066843 | A1 * | 3/2010 | Muramatsu ............. | 348/208.14 |
| 2011/0234885 | A1 * | 9/2011 | Muramatsu ................... | 348/345 |

FOREIGN PATENT DOCUMENTS

| JP | A-04-261508 | 9/1992 |
|---|---|---|
| JP | A-05-005929 | 1/1993 |
| JP | A-2001-174691 | 6/2001 |
| JP | A-2003-015019 | 1/2003 |
| JP | A-2004-247921 | 2/2004 |
| JP | A-2005-215040 | 8/2005 |
| JP | A-2005-338352 | 12/2005 |
| JP | A-2006-025238 | 1/2006 |

OTHER PUBLICATIONS

Office Action issued May 22, 2012 in Application No. JP 2007-179210 with English translation.
Feb. 7, 2011 Office Action issued in U.S. Appl. No. 12/216,688.
Jun. 7, 2011 Office Action issued in Japanese Patent Application No. 2007-179210 (with English-language translation).
Dec. 18, 2012 Office Action issued in Japanese Patent Application No. 2007-179210 (with translation).

\* cited by examiner

*Primary Examiner* — Lin Ye
*Assistant Examiner* — John H Morehead, III
(74) *Attorney, Agent, or Firm* — Oliff PLC

(57) ABSTRACT

An image detection device includes: a subject detector that acquires image information in an image field of an imaging optics with an image sensor, and detects a position of a subject in the image field based upon reference information related to an image of the subject and the image information; and a magnification detector that detects a magnification of the imaging optics. And the subject detector starts operation to detect the position of the subject, when the magnification has become greater than or equal to a predetermined value.

12 Claims, 14 Drawing Sheets

FIG.6A
FIG.6B
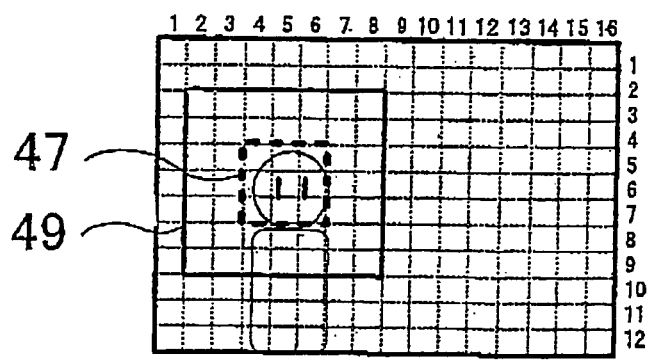
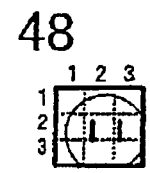

IMAGE DETECTION DEVICE, FOCUSING DEVICE, IMAGE-CAPTURING DEVICE, IMAGE DETECTION METHOD, AND FOCUSING METHOD

This is a Continuation of application Ser. No. 12/216,688 filed Jul. 9, 2008 now abandoned. The disclosure of the prior application is hereby incorporated by reference herein in its entirety.

INCORPORATION BY REFERENCE

The disclosures of the following priority application and US Patent document are herein incorporated by reference: Japanese Patent Application No. 2007-179210 filed Jul. 9, 2007; and U.S. Pat. No. 5,659,816.

BACKGROUND OF THE INVENTION

1. Field of the Invention

The present invention relates to an image detection device, a focusing device, an image-capturing device, an image detection method, and a focusing method.

2. Description of Related Art

An auto focus system is per se known that is endowed with an automatic focus (AF) function of detecting the defocus amounts of a photographic lens for a plurality of focus detection areas that are set within the photographic scene, and driving the focus lens to focus it based upon the defocus amount of any one of those areas, and with an image tracking function of storing an image of a photographic subject in the photographic image that is to be the subject of tracking as a template image (a reference image), and of tracking the photographic subject that is to be the subject of tracking while searching, within images that are repeatedly captured, for images that are the same as the template image or that resemble it; and that selects the focus detection area corresponding to the position on the scene that is the result of image tracking and drives the photographic lens according to the defocus amount of that focus detection area, so as to focus it (for example, refer to Japanese Laid-Open Patent Publication 2005-215040).

SUMMARY OF THE INVENTION

Now, if the subject of tracking is far away from the camera, when the image of the subject of tracking within the photographic image is cut out and is made into the template image (the reference image) and the image tracking operation is started, the image of the subject of tracking becomes small, and a large number of photographic subjects other than the subject of tracking and items of the background and the like may be included within the template image. When performing image tracking using this type of template image, the possibility is high that some photographic subject other than the proper tracking subject, or a portion of the background, will mistakenly be taken as being the tracking subject, and in this case the problem arises that the tracking performance of the image tracking function deteriorates.

According to the 1st aspect of the present invention, an image detection device, comprises: a subject detector that acquires image information in an image field of an imaging optics with an image sensor, and detects a position of a subject in the image field based upon reference information related to an image of the subject and the image information; and a magnification detector that detects a magnification of the imaging optics. And the subject detector starts operation to detect the position of the subject, when the magnification has become greater than or equal to a predetermined value.

According to the 2nd aspect of the present invention, in the image detection device according to the 1st aspect, it is preferred that the image detection device further comprises a reference information setting circuit that sets information corresponding to the image of the subject within the image information acquired by the image sensor as the reference information, when the magnification is greater than or equal to the predetermined value.

According to the 3rd aspect of the present invention, in the image detection device according to the 2nd aspect, it is preferred that: the image detection device further comprises a focus detector that detects focusing states of the imaging optics for a plurality of focus detection positions that are set within the image field and a position selector that selects one of the plurality of focus detection positions, based upon the focusing states that have been detected for the plurality of focus detection positions; and the reference information setting circuit sets the image information that corresponds to a focus detection position selected by the position selector as the reference information.

According to the 4th aspect of the present invention, in the image detection device according to the 3rd aspect, it is preferred that: the image detection device further comprises a scene classifier that classifies a scene based upon the image information from the image sensor; and the position selector selects a focus detection position based upon focusing states that have been detected for a plurality of focus detection positions that are positioned in a range corresponding to the scene within the image field.

According to the 5th aspect of the present invention, in the image detection device according to the 3rd aspect, it is preferred that: the image detection device further comprises a person detector that detects a position of a human body within the image field based upon the image information from the image sensor; and the position selector selects a focus detection position based upon focusing states that have been detected for a plurality of focus detection positions that correspond to the position of the human body within the image field.

According to the 6th aspect of the present invention, a focusing device comprises: an image detection device according to the 3rd aspect; a position determining circuit that determines the focus detection position to be used for performing focusing of the imaging optics, based upon the position of the subject detected by the subject detector within the image field, and upon the focusing states for the plurality of focus detection positions that are detected by the focus detector; and a focusing adjuster that performs focusing of the imaging optics, based upon the focusing state for the focus detection position that has been determined by the position determining circuit.

According to the 7th aspect of the present invention, a focusing device comprises: an image detection device according to the 4th aspect; a position determining circuit that determines the focus detection position to be used for performing focusing of the imaging optics, based upon the position of the subject detected by the subject detector within the image field, and upon the focusing states for the plurality of focus detection positions that are detected by the focus detector; and a focusing adjuster that performs focusing of the imaging optics, based upon the focusing state for the focus detection position that has been determined by the position determining circuit.

According to the 8th aspect of the present invention, a focusing device comprises: an image detection device according to the 5th aspect; a position determining circuit that determines the focus detection position to be used for performing focusing of the imaging optics, based upon the position of the subject detected by the subject detector within the image field, and upon the focusing states for the plurality of focus detection positions that are detected by the focus detector; and a focusing adjuster that performs focusing of the imaging optics, based upon the focusing state for the focus detection position that has been determined by the position determining circuit.

According to the 9th aspect of the present invention, an image-capturing device comprises a focusing device according to the 6th aspect.

According to the 10th aspect of the present invention, an image detection device comprises: a subject detector that acquires image information in an image field of an imaging optics with an image sensor, and detects a position of a subject in the image field based upon reference information related to an image of the subject and the image information; a magnification detector that detects a magnification of the imaging optics; a focus detector that detects focusing states of the imaging optics for a plurality of focus detection positions that are set within the image field; and a judging circuit that judges whether or not the focusing states detected by the focus detector are reliable. And the subject detector starts operation to detect the position of the subject based upon the magnification detected by the magnification detector, after the judging circuit has judged that the focusing states are reliable.

According to the 11th aspect of the present invention, an image detection method comprises: acquiring image information in an image field of an imaging optics with an image sensor; detecting a position of a subject in the image field based upon reference information related to an image of the subject and the image information; detecting a magnification of the imaging optics; and starting operation to detect the position of the subject, when the magnification has become greater than or equal to a predetermined value.

According to the 12th aspect of the present invention, in the image detection method according to the 11th aspect, it is preferred that information corresponding to the image of the subject within the image information acquired with the image sensor is set as the reference information, when the magnification is greater than or equal to the predetermined value.

According to the 13th aspect of the present invention, in the image detection method according to the 12th aspect, it is preferred that: focusing states of the imaging optics are detected for a plurality of focus detection positions that are set within the image field; one of the plurality of focus detection positions is selected, based upon the focusing states that have been detected for the plurality of focus detection positions; and the image information that corresponds to a selected focus detection position is set as the reference information.

According to the 14th aspect of the present invention, in the image detection method according to the 13th aspect, it is preferred that: a scene is classified based upon the image information from the image sensor; and a focus detection position is selected based upon focusing states that have been detected for a plurality of focus detection positions that are positioned in a range corresponding to the scene within the image field.

According to the 15th aspect of the present invention, in the image detection method according to the 13th aspect, it is preferred that: a position of a human body within the image field is detected based upon the image information from the image sensor; and a focus detection position is selected, based upon focusing states that have been detected for a plurality of focus detection positions that correspond to the position of the human body within the image field.

According to the 16th aspect of the present invention, a focusing method comprises: detecting a position of a subject with an image detection method according to the 13th aspect; determining the focus detection position to be used for performing focusing of the imaging optics, based upon the detected position of the subject within the image field, and upon the focusing states for the plurality of focus detection positions; and performing focusing of the imaging optics based upon the focusing state for the focus detection position that has been determined.

According to the 17th aspect of the present invention, a focusing method comprises: detecting a position of a subject with an image detection method according to the 14th aspect; determining the focus detection position to be used for performing focusing of the imaging optics, based upon the detected position of the subject within the image field, and upon the focusing states for the plurality of focus detection positions; and performing focusing of the imaging optics based upon the focusing state for the focus detection position that has been determined.

According to the 18th aspect of the present invention, a focusing method comprises: detecting a position of a subject with an image detection method according to the 15th aspect; determining the focus detection position to be used for performing focusing of the imaging optics, based upon the detected position of the subject within the image field, and upon the focusing states for the plurality of focus detection positions; and performing focusing of the imaging optics based upon the focusing state for the focus detection position that has been determined.

According to the 19th aspect of the present invention, an image detection method comprises: acquiring image information in an image field of an imaging optics with an image sensor; detecting a position of a subject in the image field based upon reference information related to an image of the subject and the image information; detecting a magnification of the imaging optics; detecting focusing states of the imaging optics for a plurality of focus detection positions that are set within the image field; judging whether or not the detected focusing states are reliable; and starting operation to detect the position of the subject based upon the detected magnification, after it has been judged that the focusing states are reliable.

BRIEF DESCRIPTION OF THE DRAWINGS

FIGS. 6A and 6B are further figures for explanation of this photographic subject tracking method;

DESCRIPTION OF THE PREFERRED EMBODIMENTS

Now, an embodiment of an image-capturing device (a single lens reflex digital still camera) will be explained that is endowed with an automatic focus adjustment (automatic focusing) (AF) function of detecting the focus adjustment states (focusing states) (in this embodiment, the defocus amount) of a photographic lens for a plurality of focus detection areas that are set within a photographic scene (a photographic image field) and of focus-driving the photographic lens based upon the defocus amount of any one or a plurality of these areas, and with an image tracking function of storing an image of the photographic subject within the photographic image that is to be the object of tracking as a template image (a reference image), and of tracking the photographic subject that is to be the subject of tracking while searching within images that are repeatedly captured for an image that agrees with the template image or resembles it (i.e. of template matching).

Figure 1:
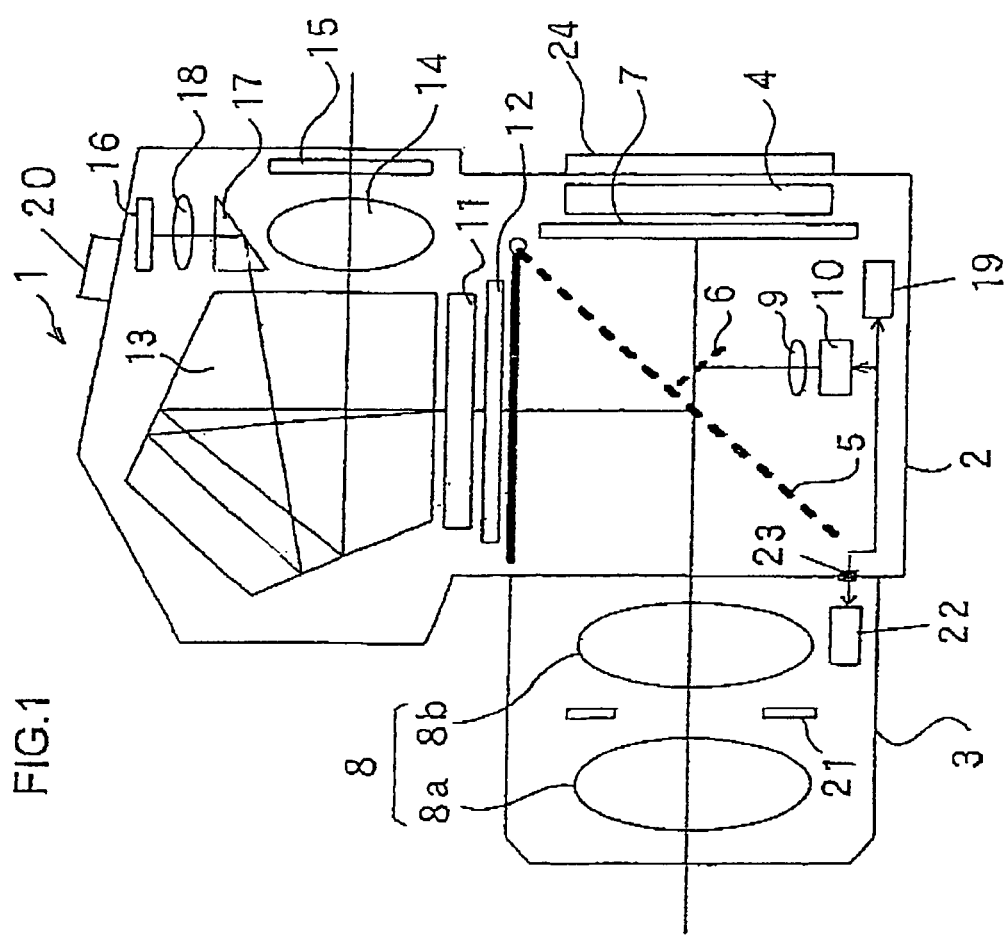
FIG. 1 is a figure showing the structure of one embodiment of the present invention.

FIG. 1 shows the structure of an image capturing device 1 (a single lens reflex digital still camera) that includes an image detection device according to one embodiment of the present invention. It should be understood that devices and circuitry of the camera that have no direct relationship with the present invention are not shown in FIG. 1, and explanation thereof will be omitted. An interchangeable lens 3 is detachably fitted to the main body 2 of the camera 1 of this embodiment. A first image sensor 4 is provided to the camera main body 2 for capturing an image of a photographic subject and recording this image. This first image sensor 4 may be built as a CCD or CMOS sensor or the like. During photography, a quick return mirror 5 and a sub-mirror 6 are retracted to positions removed from the photographic optical path as shown by the solid lines, and a shutter 7 is opened, so that an image of the photographic subject is imaged by a photographic lens 8 upon a light reception surface of the first image sensor 4.

A focus detection optical system 9 and a range-finding element 10 are provided at the bottom portion of the camera main body 2, for detecting the focus adjustment state of the photographic lens 8. In this embodiment, an example is shown in which the split pupil phase detection method is employed as the method of focus detection. In the focus detection optical system 9, a pair of ray bundles for focus detection that have passed through the photographic lens 8 are conducted to a light reception surface of the range-finding element 10, and create a pair of optical images. The range-finding element 10 includes, for example, a pair of CCD line sensors, and outputs a focus detection signal that corresponds to the pain of optical images. Before photography, the quick return mirror 5 and the sub-mirror 6 are set to positions within the photographic optical path as shown by the broken line, and the pair of ray bundles for focus detection from the photographic lens 8 pass through a half mirror portion of the quick return mirror 5 and are reflected by the sub-mirror 6, thus being conducted to the focus detection optical system 9 and the range-finding element 10.

A viewfinder optical system is provided at the upper portion of the camera main body 2. Before photography, the quick return mirror 5 and the sub-mirror 6 are positioned as shown by the broken line, and the light of the photographic subject from the photographic lens 8 is reflected by the quick return mirror 5 and is conducted to a focus plate 11, so that an image of the photographic subject is imaged upon the focus plate 11. A liquid crystal display element 12 displays photographic information such as a focus detection area mark or the like superimposed over the image of the photographic subject that is imaged upon the focus plate 11, and also displays various types of photographic information such as the exposure value or the like at a position outside the image of the photographic subject. The image of the photographic subject upon the focus plate 11 is conducted to an eyepiece window 15 via a roof pentaprism 13 and an eyepiece lens 14, so that it is possible for the photographer visually to check the image of the photographic subject and the photographic information.

Furthermore, a second image sensor 16 that captures an image of the photographic subject for photographic subject tracking and photometry is provided to the viewfinder optical system at the upper portion of the camera main body 2. The image of the photographic subject that is imaged upon the focus plate 11 is imaged for a second time upon the light reception surface of the second image sensor 16 via the roof pentaprism 13, a prism 17, and an imaging lens 18. And the second image sensor 16 outputs an image signal corresponding to this image of the photographic subject. The image of the photographic subject that is imaged upon the focus plate 11 before photography is conducted to the second image sensor 16 via the roof pentaprism 13, the prism 17, and the imaging lens 18, so that an image of the photographic subject is formed for a second time upon the light reception surface of the second image sensor 16. Image tracking control and exposure control are performed based upon this image of the photographic subject that is captured by the second image sensor 16; this matter will be described in more detail hereinafter.

A body drive control device 19, actuation members 20, and the like are further provided to the camera main body 2. The body drive control device 19 includes a microcomputer that will be described in detail hereinafter, and peripheral devices such as a memory, an A/D converter, and the like, and performs various types of control and calculations for the camera 1. The actuation members 20 include switches and/or selectors for actuating the camera 1, such as a shutter button, a focus detection area selection switch, a photographic mode selection switch, a focus adjustment mode selection switch, and the like.

A zooming lens 8a, a focusing lens 8b, an aperture (iris) 21, a lens drive control device 22 and the like are provided to the interchangeable lens 3. It should however be understood that although, in this embodiment, the photographic lens 8 is superficially shown by the zooming lens 8a, the focusing lens 8b, and the aperture 21, the structure of the photographic lens 8 is not limited to the structure shown in FIG. 1. The lens drive control device 22 includes a microcomputer and peripheral devices such as a memory, a drive circuit, an actuator, a sensor and the like not shown in the figures, and performs drive control of the lenses 8a and 8b and the aperture 21 and detection of their positions. Information such as the focal length of the interchangeable lens 3 and the maximum aperture value thereof and the like is stored in a memory that is housed internally to the lens drive control device 22.

The body drive control device 19 and the lens drive control device 22 perform communication via a contact point 23 upon the lens mounting portion. Information such as the lens drive amount and the aperture value to be controlled and the like is transmitted from the body drive control device 19 to the lens drive control device 22. On the other hand, information such as the focal length by the zooming lens 8a, the photographic distance by the focusing lens 8b, the aperture value and the like is transmitted from the lens drive control device 22 to the body drive control device 19. A monitor 24 is provided upon the rear surface of the camera main body 2, and displays various types of photographic information, as well as a through image (a live view image) and the photographed image.

Figure 2:
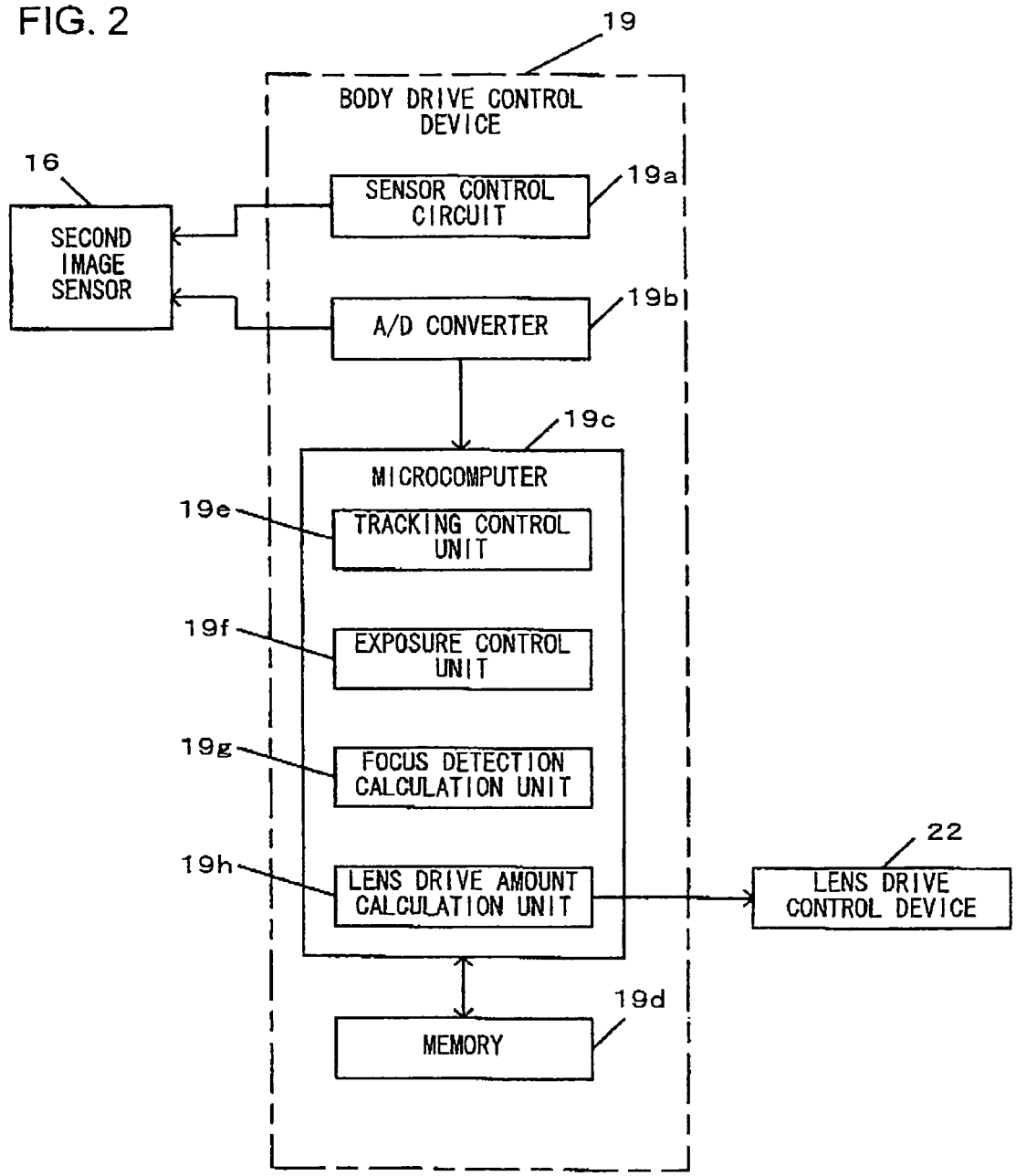
FIG. 2 is a figure showing the detailed structure of an embodiment of a body drive control device.

FIG. 2 shows the detailed structure of the body drive control device 19. It should be understood that control functions that have no direct relationship to the present invention are not shown in this figure, and explanation thereof will be omitted. This body drive control device 19 includes a sensor control circuit 19a, an A/D converter 19b, a microcomputer 19c, a memory 19d, and the like. The sensor control circuit 19a controls accumulation of electric charge by the second image sensor 16 and reading out thereof. The A/D converter 19b converts an analog image signal outputted from the second image sensor 16 to a digital image signal. The microcomputer 19c includes a tracking control unit 19e, an exposure control unit 19f, a focus detection calculation unit 19g, and a lens drive amount calculation unit 19h, all of which are implemented in software. A memory 19d stores information such as a template image (a reference image) for image tracking and defocus amounts, lens information such as the focal length of the photographic lens 8, the maximum aperture value, the aperture value, a conversion coefficient between the amount of deviation of the image and the defocus amount, and so on.

The tracking control unit 19e stores in the memory 19d, as a template image (a reference images), an image within the image of the photographic subject captured by the second image sensor 16 that corresponds to the position of a tracking subject that has been manually designated by the photographer, or to the position of a tracking subject that has been set automatically by the camera 1, and thereafter recognizes the position of the tracking subject by searching from within the images that are repeatedly photographed by the second image sensor 16 for an image region that agrees with, or that resembles, this template image. And the exposure calculation unit 19f calculates an exposure value based upon the image signal that has been captured by the second image sensor 16.

The focus detection calculation unit 19g detects the focus adjustment state of the photographic lens 8 based upon a focus detection signal corresponding to the pair of optical images outputted from the range-finding element 10, and thereby detects the defocus amount. Although this matter will be described in detail hereinafter, it should be understood that a plurality of focus detection areas are set within the scene (image field) photographed by the photographic lens 8, and, for each of these focus detection areas, the range-finding element 10 outputs a focus detection signal that corresponds to the respective pair of optical images, and then the focus detection calculation unit 19g detects the defocus amount for each of these focus detection areas, based upon the focus detection signal that corresponds to its respective pair of optical images.

In this embodiment, when an automatic area selection mode is set in which the focus detection area for which focus adjustment of the photographic lens 8 is performed is automatically selected, from among the defocus amounts that have been detected for the various focus detection areas, that area in which the defocus amount shows the closest range is selected as the area for performing focus adjustment. It should be understood that the area selection algorithm when the automatic area selection mode is set is not limited to priority selection of the area that is at the closest range. The lens drive amount calculation unit 19h converts the defocus amount that has been detected into a lens drive amount.

Figure 3:
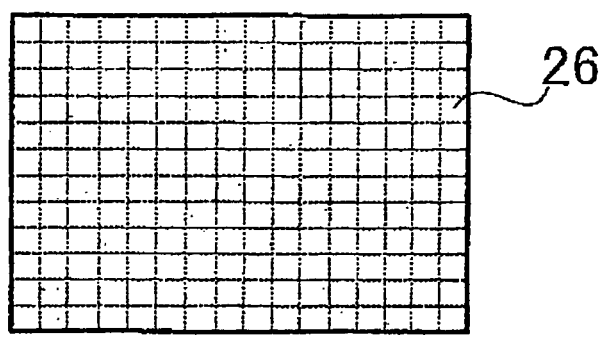
FIG. 3 is a figure showing the detailed structure of a second image sensor.
Figure 4:
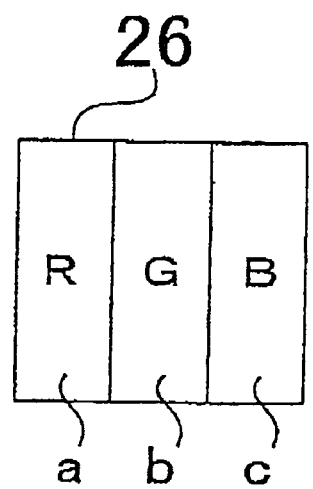
FIG. 4 is a figure showing the detailed structure of a pixel of this second image sensor.

FIG. 3 is an elevation view showing the detailed structure of the second image sensor 16. The second image sensor 16 includes a plurality of pixels (pixels, photoelectric conversion elements) 26 arranged in the form of a matrix (in this embodiment 16 horizontally by 12 vertically, for a total of 192). Each of these pixels 26 is divided into three portions 26a, 26b, and 268 as shown in FIG. 4, and respective red R, green G, and blue B primary color filters are provided to these portions 26a, 26b, and 26c. Due to this, each of the pixels 26 is able to output an RGB signal, so as to make up an image of the photographic subject. It should be understood that the number of pixels of the second image sensor 16 is not to be considered as being limited to the number shown in the figure and described above.

Next, the photographic subject tracking operation of this embodiment will be explained. FIGS. 5 through 7B are for explanation of the photographic subject tracking method of this embodiment, and FIGS. 8 through 11 are flow charts showing the flow of photographic subject tracking processing in this embodiment. Apart from when the shutter button is full pressed and photography is performed, the quick return mirror 5 is set within the photographic optical path shown by the broken line in FIG. 1, and the light of the photographic subject that is incident from the photographic lens 8 is imaged upon the focus plate 11. And the image of the photographic subject upon the focus plate 11 is conducted via the roof pentaprism 13, the prism 17, and the imaging lens 18 to the second image sensor 16, so that a signal representing an image of the photographic subject is outputted from the second image sensor 16.

Figure 5:
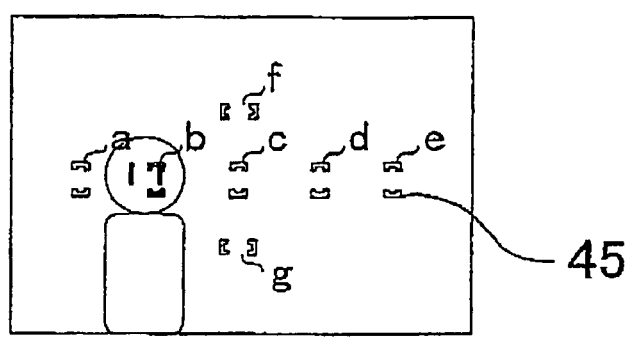
FIG. 5 is a figure for explanation of an embodiment of the method of the present invention for tracking a photographic subject.

FIG. 5 is the image of the photographic subject that the photographer can see through the eyepiece window 15 (i.e. the viewfinder image). Photographic information such as a focus detection area mark or the like is displayed by the liquid crystal element 12 as superimposed upon the image of the photographic subject that is imaged upon the focus plate 11 by the photographic lens 8, and is conducted via the roof pentaprism 13 and the eyepiece lens 14 to the eyepiece window 15, so that it is possible for the photographer to check the image of the photographic subject and the photographic information visually. In this embodiment, a total of seven focus detection areas 45a through 45g are set within the photographic scene of the photographic lens 8, and corresponding area marks are superimposed by the liquid crystal display element 12 upon the image of the photographic subject upon the focus plate 11, so as to be displayed in the positions of these focus detection areas 45a through 45g. When any desired one of these focus detection areas is selected with the focus detection area selection switch of the actuation members 20, then the corresponding mark 45 for this focus detection area is displayed as illuminated.

Figure 8:
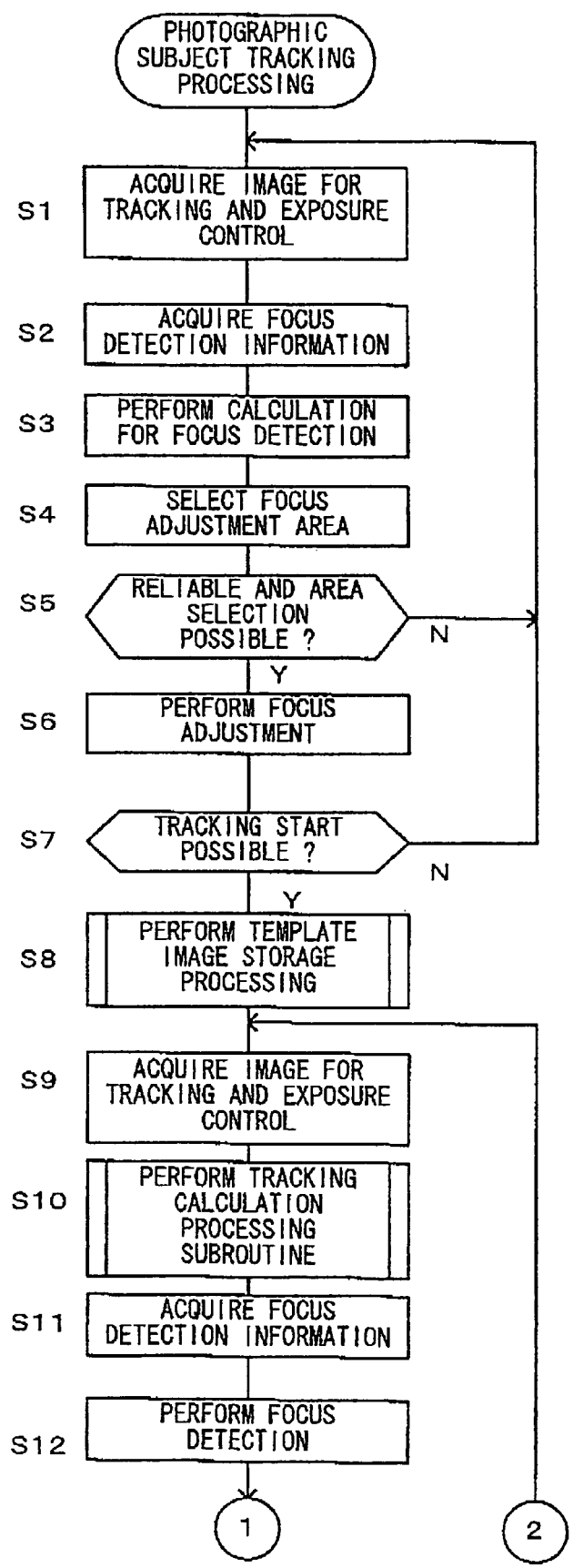
FIG. 8 is a flow chart showing the flow of processing for tracking a photographic subject, according to this embodiment.
Figure 9:
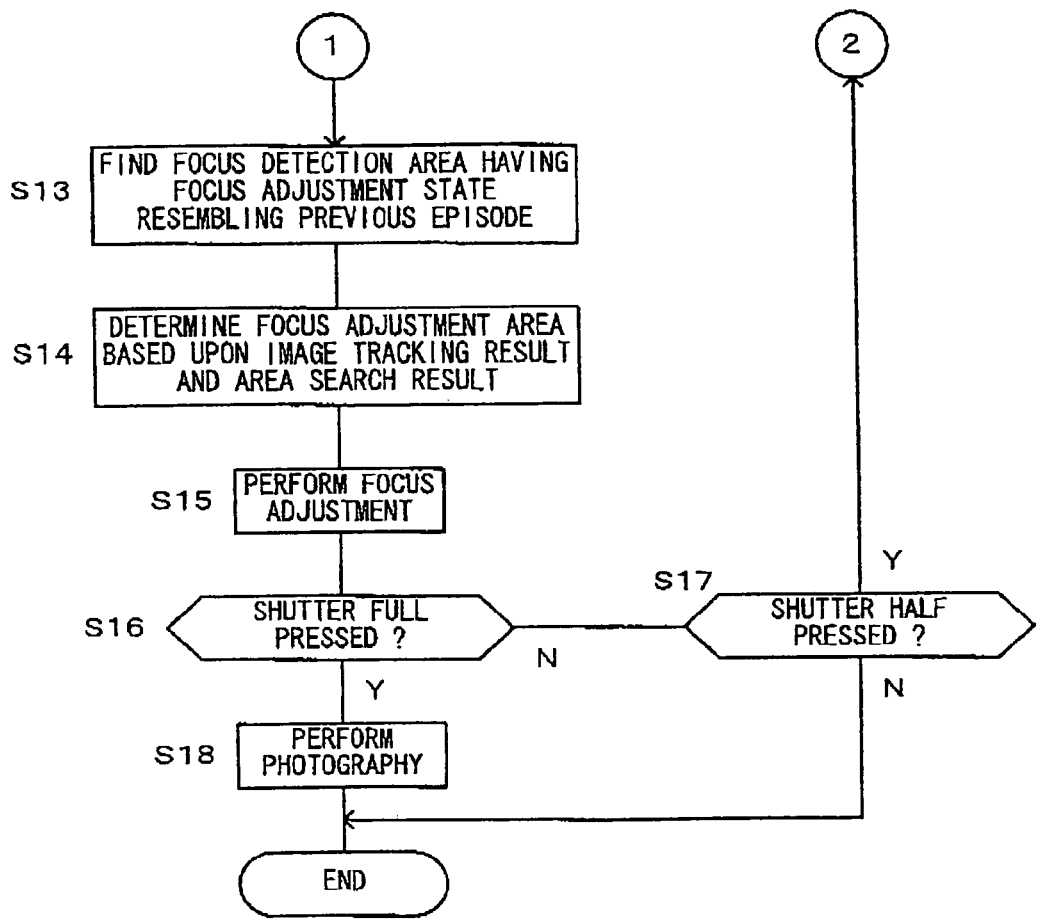
FIG. 9 is a flow chart continuing on from FIG. 8, further showing this processing for tracking a photographic subject.

When the automatic area selection mode is set with the focus adjustment mode selection switch of the actuation members 20 and the shutter button of the actuation members 20 is half pressed, then the body drive control device 19 starts the tracking processing of the photographic subject shown in FIG. 8. First, in a step S1, an image for both image tracking and exposure control is acquired by the second image sensor 16. This image is expressed as RGB values for each of its pixels:

$$R[x,y], G[x,y], B[x,y] \quad (1)$$

Based upon these RGB values for each of the pixels, the color information (here, the hue) RG, BG for each of the pixels is calculated, and also the luminance information L is calculated based upon the exposure time period T when the image was acquired, the gain Gain, and color combination coefficients Kr, Kg, and Kb:

$$RG[x,y]=\text{Log}_2(R[x,y])-\text{Log}_2(G[x,y]),$$

$$BG[x,y]=\text{Log}_2(B[x,y])-\text{Log}_2(G[x,y]),$$

$$L[x,y]=\text{Log}_2(Kr \times R[x,y]+Kg \times G[x,y]+Kb \times B[x,y])-\text{Log}_2(T)-\text{Log}_2(\text{Gain}) \quad (2)$$

This color information RG and BG and the luminance information L are stored in the memory 19d for use as the template image.

In a step S2, focus detection signals corresponding to a pair of optical images for focus detection for each of the focus detection areas 45a through 45g are acquired by the range-finding element 10. And, in the next step S3, the focus adjustment states of the photographic lens 8 for each of the focus detection areas 45a through 45g, in other words the defocus amounts, are detected based upon the focus detection signals. And, in a step S4, that focus detection area for which the defocus amount, among the defocus amounts of the various focus detection areas 45a through 45g, shows the closest range, is selected as the focus detection area for which focus adjustment is to be performed (hereinafter termed the "focus adjustment area").

In a step S5, it is judged whether or not those defocus amounts that are reliable for the various focus detection areas 45a through 45g are detected, and moreover it is possible to perform automatic selection of a focus adjustment area based upon these defocus amounts, and if focus detection is impossible for the focus detection areas 45a through 45g, or if reliable defocus amounts are not obtained, so that the focus adjustment area cannot be automatically selected, then the flow of control returns to the step S1 and the processing described above is repeated. On the other hand, if reliable defocus amounts are detected for the focus detection areas 45a through 45g, so that the focus adjustment area can be selected automatically based upon these defocus amounts, then the flow of control proceeds to a step S6, in which the defocus amount that has been detected for the focus adjustment area is converted into a lens drive amount, and the focusing lens 8b is driven by the lens drive control device according to this lens drive amount, so that focus adjustment is performed.

The judgment whether or not each of the defocus amounts is reliable is performed according to the following expressions. If the following conditions are satisfied, it is judged that the defocus amount is reliable.

$$E>E1 \text{ and } Cex/E<G1$$

The value E1 and the value G1 are predetermined threshold values. The value E is based upon correlation quantities between a pair of focus detection signals, and is a larger value among values between the smallest correlation quantity and adjacent values. This value depends on contrast of the subject, and if the value is the larger, it means the larger contrast, and it means the more reliable. The Cex value is a difference value when a pair of focus detection signals agree with each other the most strongly, and the Cex should be zero. However, the Cex value does not become zero since a small difference occurs between a pair of focus detection signals due to noise and parallax between two areas on a lens. The influence of noise and the influence of a difference between images of the subject become smaller, if the contrast of the subject is larger. Therefore, the value of Cex/E is used as a value indicating agreement of a pair of focus detection signals. If the value of Cex/E becomes close to zero, the agreement of a pair of focus detection signals becomes strong and the reliability becomes high.

It should be noted that the method of judgment of reliable defocus amount is known, and the details are omitted. See U.S. Pat. No. 5,659,816, for example.

And, in a step S7, a check is made as to whether or not a condition for starting image tracking is satisfied. In this embodiment, the image tracking operation is started if the image magnification is greater than or equal to a tracking start decision threshold value that is set in advance. Here, the image magnification is calculated according to the following Equation, based upon the focal distance of the photographic lens that has been acquired from the lens drive control device 22 and the photographic distance:

$$(\text{image magnification})=(\text{focal distance})/(\text{photographic distance}) \quad (3)$$

This tracking start decision threshold value for image magnification may be, for example, around 0.02. This is a magnification at which a standard human face occupies approximately 20%~25% of the screen of the second image sensor 16 in the vertical direction. If this image tracking start condition is not satisfied, in other words if the image magnification is less than the tracking start decision threshold value, then the flow of control returns to the step S1 and the processing described above is repeated.

Figure 10:
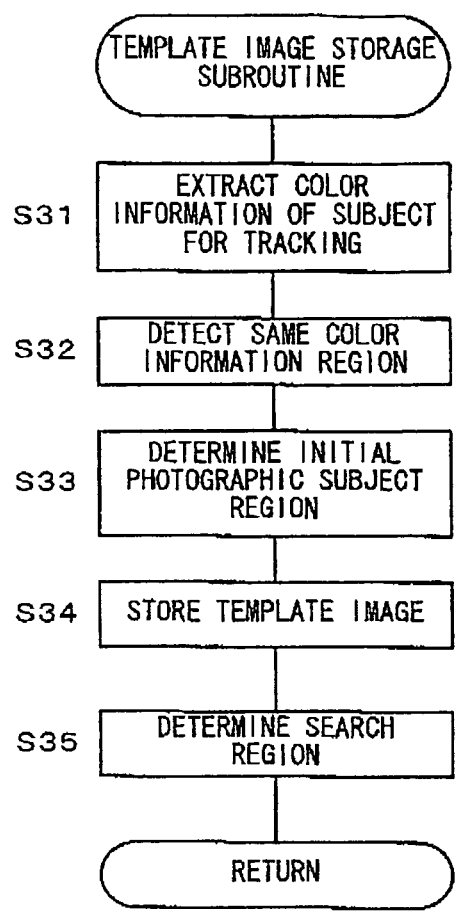
FIG. 10 is a flow chart showing processing of a subroutine for storing a template image.

If the image tracking start condition is satisfied, in other words if the image magnification is greater than or equal to the tracking start decision threshold value, then the flow of control proceeds to a step S8, and the template image storage processing shown in the flow chart of FIG. 10 is executed. In a step S31 of FIG. 10, the luminance information L and the color information RG, BG of the image at the position that corresponds to the focus adjustment area is extracted from the color information RG, BG and the luminance information L of the image for tracking that has been acquired and stored in the step S1 of the FIG. 8 flow chart, and is stored as the color information of the tracked subject. And in the next step S32, as shown in FIG. 6A, a same color information region is detected that has the same color information as the color information of the tracked subject at the peripheral portion of the focus adjustment area within the image for tracking, and then in the next step S33 this same color information region is taken as being the initially tracked photographic subject region 47.

In a step S34, the color information RG, BG and the luminance information L of the image of the tracked photographic subject region 47 is stored in the memory 19d as template image information 48 (refer to FIG. 6B) for subsequent image tracking processing. For example, if as shown in FIG. 6A the starting position of the tracked photographic subject region 47 is (x,y)=(4,5), then the color information (here the hue) RGref and BGref and the luminance information Lref of the template image 48 are given as follows:

$$RGref[rx,ry]=RG[x,y],$$

$$BGref[rx,ry]=BG[x,y],$$

$$Lref[rx,ry]=L[x,y] \, (rx,ry=1\sim3, x=4\sim6, y=5\sim7) \quad (4)$$

Next, in a step S35, a region consisting of the tracked photographic subject region 47 as a center, enlarged by a predetermined number of pixels (here this number of pixels is taken as being two) upwards and downwards, and leftwards and rightwards, is set as the search region 49. In the example shown in FIG. 6A, this search region 49 becomes the region x=2~8, y=3~9. Thereafter this storage processing for the template image terminates, and the flow of control returns to the step S9 of the FIG. 8 routine.

In this step S9 of FIG. 8, an image for both image tracking and exposure control is acquired by the second image sensor 16, and the color information RG[x,y], BG[x,y] and the luminance information L[x,y] are calculated in a similar manner to the processing of the step S1, and are stored in the memory 19d. And in the subsequent step S10 a tracking calculation processing subroutine shown in the flow chart of FIG. 11 is executed.

Figure 11:
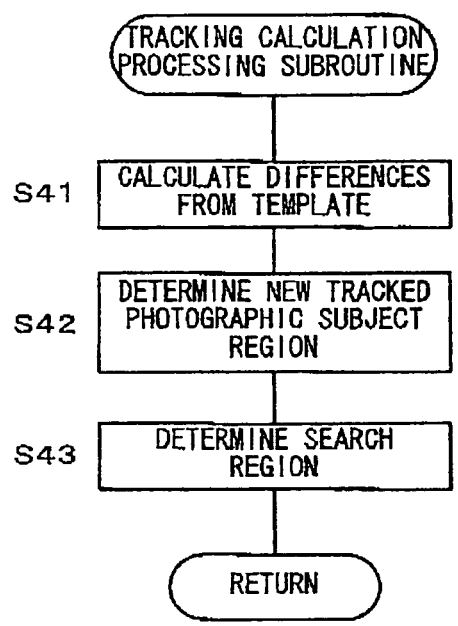
FIG. 11 is a flow chart showing processing of a subroutine for tracking calculation processing.

In a step S41 of the FIG. 11 subroutine, regions of the same size as the template image 48 are sequentially cut out from the search region 49 within the image for tracking, and the color information difference Diff is calculated between corresponding pixels in the cut out images and in the template image 48. As shown by the thick broken lines in FIG. 7A, these color information differences Diff with the template image 48 are calculated while sliding around the cut out region one pixel at a time within the search region 49.

Figure 7B:
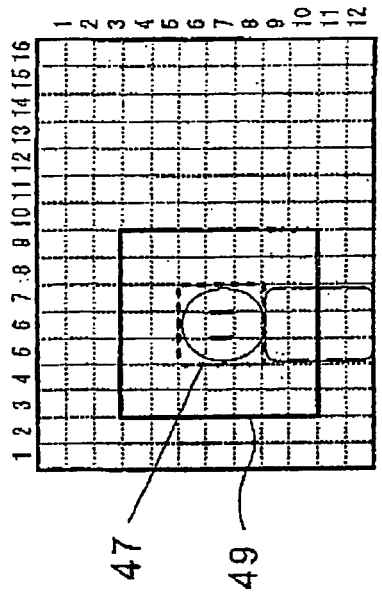
FIGS. 7A and 7B are further figures for explanation of this photographic subject tracking method.
Figure 7A:
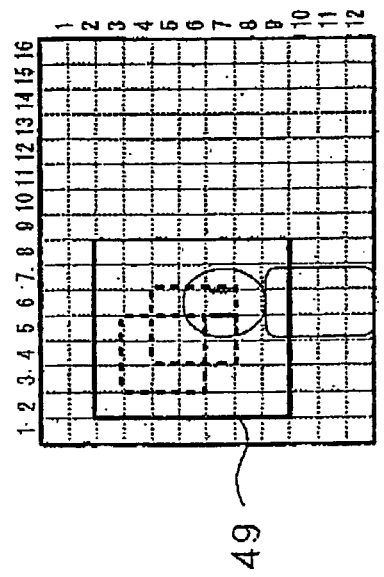

Now, if as shown in FIG. 7A the starting position of the search region 49 is taken as being (scx,scy)=(2,3), then the calculation of the difference Diff is performed in the following manner:

$$\text{Diff}[dx,dy] = \Sigma\Sigma\{ABS(RG[scx+dx-1+rx,scy+dy-1+ry]-RG\text{ref}[rx,ry]) + ABS(BG[scx+dx-1+rx,scy+dy-1+ry]-BG\text{ref}[rx,ry]) + ABS(L[scx+dx-1+rx,scy+dy-1+ry]-L\text{ref}[rx,ry])\} \quad (5)$$

In Equation (5), dy,dy=1~5, rx,ry=1~3, scx=2, scy=3, and the summations $\Sigma\Sigma$ are performed for rx=1~3 and ry=1~3.

Next, in a step S42, the minimum one among the differences Diff[dx,dy] is found, and the above described cut out region in the search region 49 for which this minimum difference was calculated is determined as being the new tracked photographic subject region 47. In this case, as shown in FIG. 7B, the cut out region whose starting position (x,y)=(5,6) is taken as being the new tracked photographic subject region 47.

At this point, it would also be acceptable additionally to perform processing for updating the image information of the template image 48, using the image information that has been newly determined for the photographic subject region 47. In this case, for example, the newest image information may be updated a little at a time into the information of the template image by adding 20% of the image information of the new photographic subject region 47 to 80% of the image information of the original template image 48, so that it becomes easier to perform tracking of changes of the photographic subject that is being tracked. In this case, it would also be acceptable not to perform this updating each time the tracking calculation is performed, but, based upon the size of the difference Diff with regard to the position that has been confirmed as being the tracked photographic subject region 47, only to perform updating when this difference Diff is smaller than some threshold value.

And, in a step S43, a region consisting of the tracked photographic subject region 47 as a center, enlarged by a predetermined number of pixels (here this number of pixels is taken as being two) upwards and downwards, and leftwards and rightwards, is set as the search region 49. In the example shown in FIG. 7B, the region x=2~8, y=3~9 is taken as the new search region 49. Thereafter, the flow of control returns to the step S11 of the FIG. 8 routine.

In a step S11 of the FIG. 8 flow chart, focus detection signals are acquired by the range-finding element 10 corresponding to a pair of optical images for focus detection for each of the focus detection areas. And in the next step S12, based upon these focus detection signals that have been acquired, the focus adjustment state of the photographic lens 8 for each of the selected focus detection areas 45a through 45g, in other words the defocus amounts, are detected. And, in a step S13 in the continuation flow chart of FIG. 9, from these defocus amounts of all of the focus detection areas 45a through 45g, the focus detection area is found for which the defocus amount most closely resembles the defocus amount of the focus detection area that was employed as the focus adjustment area during the previous episode of focus adjustment.

At this time, if it is decided from the history of the focus detection results up to and through the previous episode that the photographic subject that is the subject of tracking is shifted along the direction of the optical axis of the photographic lens 8, then it would also be acceptable not to employ the focus detection area that has a defocus amount that most closely resembles the defocus amount of the focus detection area that was employed as the focus adjustment area during the previous episode of focus adjustment, but rather to calculate the speed of shifting of the subject of tracking based upon the history of focus detection results, to forecast the defocus amount during this episode of focus adjustment from this shifting speed, and to find the focus detection area that has a defocus amount that most closely resembles this forecast defocus amount.

Next, in a step S14, the area in which focus adjustment is to be performed (i.e. the focus adjustment area) is determined based upon the new tracked photographic subject region that is the result of image tracking in the steps S9 through S10, and upon the focus detection area that is the result of area search in the steps S11 through S12. In this embodiment, the focus detection areas that correspond to the new tracked photographic subject region that is the result of image tracking and the focus detection areas that are the result of area searching are compared together, and the common focus detection area between the result of image tracking and the result of area searching is determined as being the focus adjustment area.

In the next step S15, the defocus amount that has been detected for the focus adjustment area is converted into a lens drive amount, and the focusing lens 8b is driven by the lens drive control device 22 so as to perform focus adjustment. Then, in a step S16 after this focus adjustment, actuation to full press the shutter button of the actuation members 20 is checked. If full press actuation of the shutter button is not being performed then the flow of control proceeds to a step S17, in which it is checked whether or not actuation to half press the shutter button is being performed. If actuation to half press the shutter button is being continued then the flow of control returns to the step S9 and the processing described above is repeated. On the other hand, if the actuation to half press the shutter button is not being performed, then this processing for tracking the photographic subject is terminated.

If in the step S16 it is determined that the shutter button has been full pressed, then the flow of control is transferred to a step S18, and photography is performed. In other words, the luminance of the photographic subject is detected from the image for exposure control that was acquired in the step S9, and an aperture value is determined by exposure calculation and the aperture 21 is adjusted by the lens drive control device 22. And the quick return mirror 5 and the sub-mirror 6 are retracted from the photographic optical path (mirror up action), the shutter 7 is opened, and an image of the photographic subject that has been imaged by the photographic lens 8 is captured by the first image sensor 4. Required image processing is performed upon this captured image, and then it is recorded upon an image recording medium such as a memory card or the like, not shown in the figures.

Since in this manner, according to this embodiment, it is arranged to start the image tracking operation by acquiring a template image (a reference image) of the subject for tracking when the image magnification is greater than or equal to the predetermined value, accordingly it is possible to enhance the performance for tracking the subject of tracking by acquiring a template image that is appropriate in relation to the image of the subject. In other words, it is possible to enhance the performance for detection of the subject by setting appropriate reference information in relation to the image of the subject.

A Variant of this Embodiment

Figure 12:
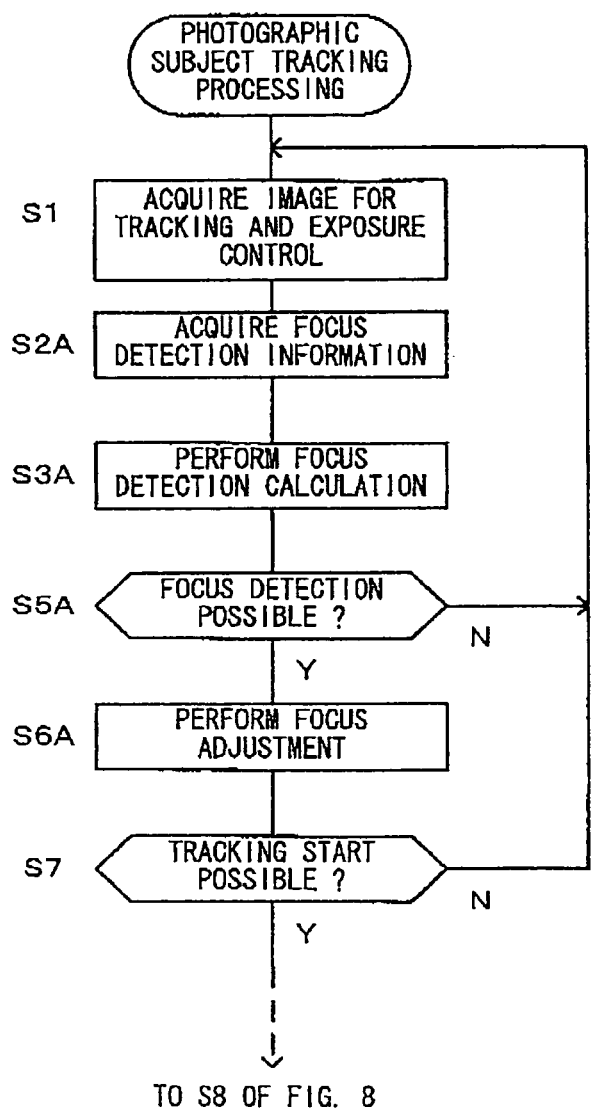
FIG. 12 is a flow chart showing the flow of processing for tracking a photographic subject, according to a variant embodiment.

Although, in the embodiment described above, an example has been shown in which, when starting image tracking, the camera automatically determines the focus detection area in which to perform focus adjustment, in other words the focus adjustment area, based upon the defocus amounts that have been detected for the focus detection areas 45a through 45g, a variant embodiment will now be explained in which the photographer selects the focus adjustment area and sets the subject of tracking manually. FIG. 12 is a flow chart showing the photographic subject tracking processing in this variant embodiment. It should be understood that, for steps that perform the same processing as the photographic subject tracking processing of the above embodiment shown in FIGS. 8 and 9, the same step numbers are used, and the explanation will center upon the aspects in which they differ therefrom.

The photographer recognizes the photographic subject that is to be the subject of tracking while looking at the image in the viewfinder, selects a focus detection area that corresponds to this photographic subject that is the subject of tracking with a focus detection area selection switch of the actuation members 20; and when, in this state, he half presses the shutter button of the actuation members 20, the body drive control device 19 starts the photographic subject tracking operation processing shown in FIG. 12. Here, the explanation will be made in terms of an example in which the focus detection area 45b shown in FIG. 5 has been thus selected as the focus detection area corresponding to the photographic subject that is the object of tracking. After an image for both image tracking and exposure control has been acquired by the second image sensor 16 in a step S1, the flow of control proceeds to a step S2A and focus detection signals are acquired by the range-finding element 10 corresponding to a pair of optical images of the focus detection area 45b for focus detection. And in the next step S3A the focus adjustment state of the photographic lens 8 for the focus detection area, in other words its defocus amount, is detected based upon the focus detection signal.

Next in a step S5A it is checked whether or not it is possible to perform focus detection for this focus detection area 45b that the photographer has selected, in other words whether or not a reliable defocus amount has been obtained, and if focus detection has not been possible or a reliable defocus amount has not been obtained, then the flow of control returns to the step S1, and the processing described above is repeated. On the other hand, if a reliable defocus amount has been obtained for the focus detection area 45b that the photographer has selected, then the flow of control proceeds to a step S6A, this defocus amount that has been obtained for the focus detection area 45b is converted into a lens drive amount, and the focusing lens 8b is driven by the lens drive control device 22 according thereto, so that focus adjustment is performed. Thereafter in a step S7 a check is made as to whether or not a condition for starting image tracking, like the one described above, is satisfied. Since the processing after the step S7 is the same as the corresponding processing in the flow charts shown in FIGS. 8 and 9, it is not shown in the figure, and explanation thereof herein is curtailed.

Another Variant of this Embodiment

Although, in the basic embodiment described above and in its variant embodiment, an example has been described in which, when image tracking is started, the camera automatically selects a focus detection area that is to be the subject of tracking, and another example has been described in which the photographer designates the focus detection area that is to be the subject for tracking, now another variant embodiment will be described in which a portion of a person (i.e. a human body (human skin)) is extracted from the image captured by the second image sensor 16, and the focus detection area that is to be the subject of tracking is selected automatically in consideration of the presence of this human body portion; or, the photographic scene is assessed, and the focus detection area for the subject of tracking is selected automatically in consideration of the photographic scene.

Figure 13:
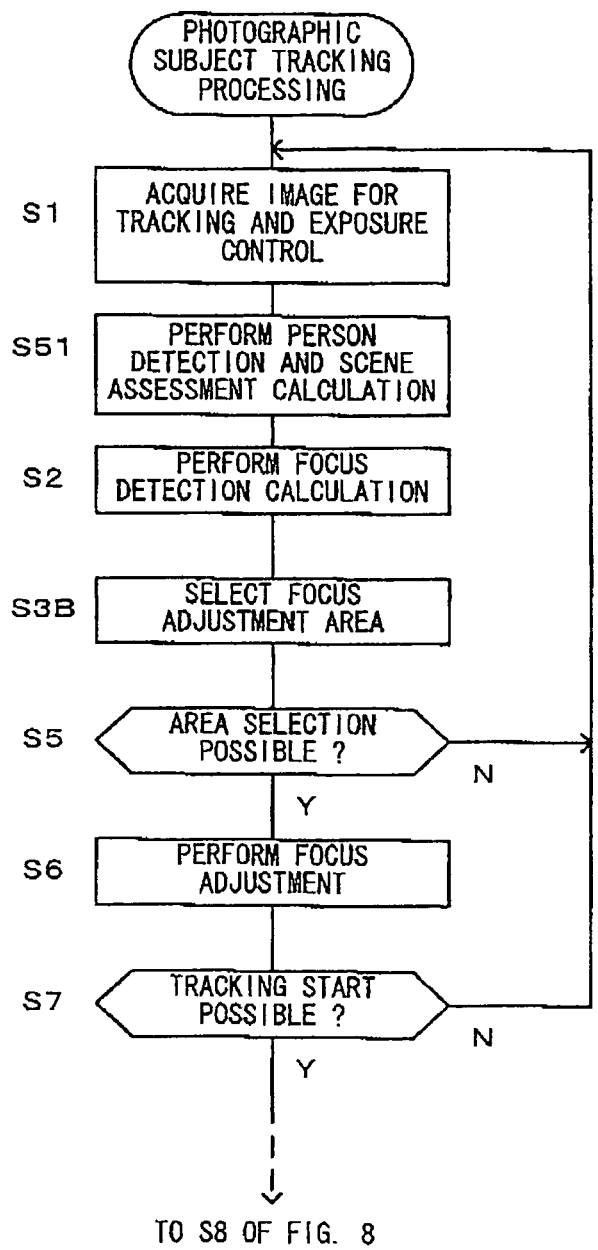
FIG. 13 is a flow chart showing the flow of processing for tracking a photographic subject, according to another variant embodiment.

FIG. 13 is a flow chart showing the photographic subject tracking processing in this other variant embodiment. It should be understood that, for steps in this figure that perform the same processing as the photographic subject tracking processing of the above embodiment shown in FIGS. 8 and 9, the same step numbers are used, and the explanation will center upon the aspects in which they differ therefrom. After having acquired an image from the second image sensor 16 for both image tracking and exposure control in the first step S1, the flow of control proceeds to a step S51, and human body detection and scene assessment calculation are executed. These will be described in detail hereinafter. After in a step S2 focus detection has been performed for the focus detection areas 45a through 45g and their defocus amounts have been acquired, in a step S3B the focus adjustment area is selected based upon the results of human body detection and scene assessment, and upon the results of focus detection.

First, the human body detection will be explained. The distribution within the scene of color information for which there is a possibility that it may relate to a human body is detected based upon the color information RG, BG of the image captured by the second image sensor 16. If the defocus amount of the focus detection area that corresponds to the distribution region for color information that may relate to a human body is the one at the closest range, then this focus detection area is selected as the focus adjustment area. And, even if the defocus amount of the focus detection area that corresponds to the distribution region having color information that may relate to a human body is not the one at the closest range, then this focus detection area is selected as the focus adjustment area if it has a defocus amount that is comparatively close to the camera. By doing this, during photography while tracking a person who is shifting, it is possible reliably to designate that person who is shifting as being the subject for tracking.

Next, the scene assessment calculation will be explained. Pattern recognition of the image captured by the second image sensor 16 is performed based upon the distribution of the color information RG, BG in this captured image, the differences in the luminance information L between the top and the bottom, between the left and the right of the scene, the absolute luminance value, the focal distance of the photographic lens, the photographic distance and the like, and the photographic scene is classified as being scenery or a portrait or the like. For example since, in the case of portrait photography, the possibility is high that a human face will be present in the upper portion of the photographic scene, accordingly that focus detection area, among the focus detection areas at the upper portion of the photographic scene, for which the closest range defocus amount has been detected, is selected as being the focus adjustment area. Furthermore since, in the case of a photographic scene that consists of scenery, for example, the possibility is high that the surface of the ground is present in the lower portion of the photographic scene, accordingly that focus detection area, among the focus detection areas at the lower portion of the photographic scene, for which the closest range defocus amount has been detected, is selected as being the focus adjustment area.

It should be understood that it would be acceptable to perform selection of the focus adjustment area by using only one or the other of the human body detection result and the scene assessment calculation result described above, or to use both of those results. In the next step S5, it is checked whether or not it has been possible to detect reliable defocus amounts for each of the focus detection areas 45a through 45g, and moreover whether or not it has been possible to select a focus adjustment area based upon these focus detection results and upon the human body detection result and/or the scene assessment calculation result described above. If it has not been possible to select a focus adjustment area, then the flow of control returns to the step S1 and the processing described above is repeated, while if it has been possible to select a focus adjustment area then the flow of control proceeds to a step S6. In this step S6, focus adjustment of the photographic lens 8 is performed based upon the defocus amount of the focus adjustment area, and then in the next step S7, as described above, a decision is made as to whether or not the condition for starting image tracking is satisfied. The subsequent processing is the same as that shown in FIGS. 8 and 9.

In the above manner, it is possible to set an appropriate subject of tracking automatically by selecting the focus adjustment area in consideration of the result of detecting a person, and/or in consideration of the result of calculation for scene assessment.

Another Variant of this Embodiment

In the embodiment described above an example was explained in which, the first image sensor 4 is provided to the camera main body 2 in order to capture an image of the photographic subject and in order to record this image, also, the focus detection optical system 9 and the range-finding element 10 are provided in order to detect the focus adjustment state of the photographic lens 8, and the second image sensor 16 for capturing an image of the photographic subject is provided in order to perform photographic subject tracking and photometry were provided. However, it would also be acceptable to perform all of detection of the focus adjustment state of the photographic lens 8, tracking of the photographic subject, and photometry by using the image that is captured by the first image sensor 4.

Figure 14:
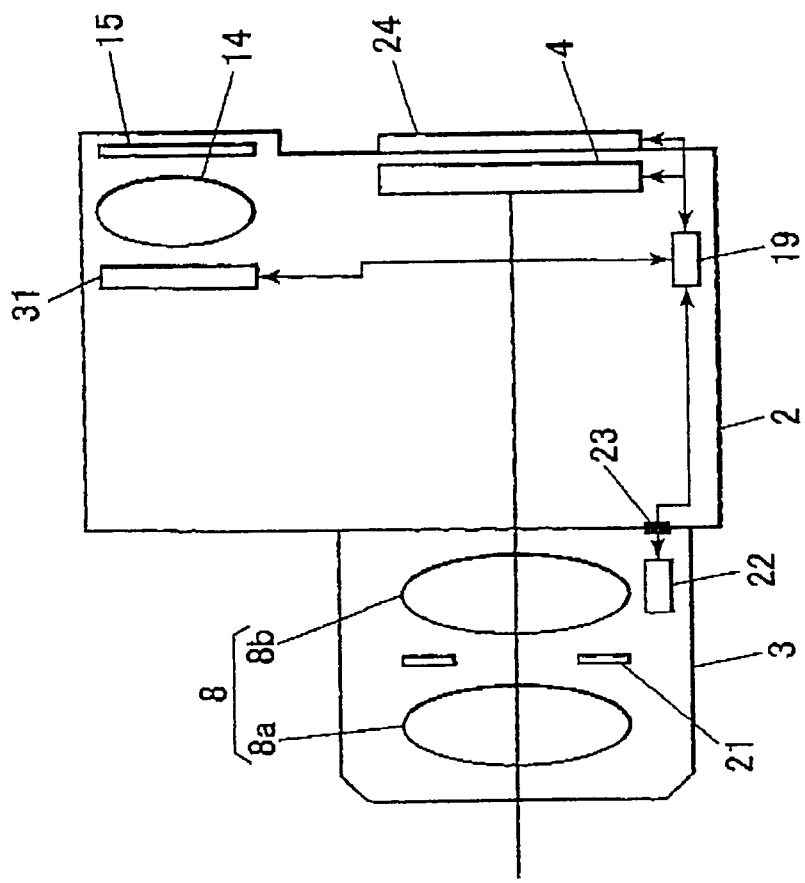
FIG. 14 is a figure showing the structure of another variant embodiment.

FIG. 14 is a figure showing an example of this type of digital camera (image-capturing device). To elements in this figure that are the same as ones in the previously described embodiments, the same reference symbols are appended.

The reference symbol 31 denotes a newly provided liquid crystal display element for EVF (Electronic View Finder) use. A through image and various types of photographic information are displayed upon this liquid crystal display element 31, in a similar manner to the monitor 24. To the digital camera of FIG. 14, there are not provided any focus detection optical system 9, range-finding element 10, second image sensor that captures an image of the photographic subject for photographic subject tracking and photometry, and the like, as was the case in the previous embodiments and variant embodiments described above. Moreover, no roof pentaprism 13 or quick return mirror 5 or the like is provided either. The shutter 7 is not provided either; instead, an electronic shutter is employed.

Just like the embodiments described above, the body drive control device 19 includes a microcomputer and its memory and peripheral units such as an A/D converter and the like, that perform various types of control for the camera 1. While this body drive control device 19 performs detection of the focus adjustment state of the photographic lens 8 by using the image that is captured by the first image sensor 4, and likewise performs tracking control and photometric control by using the image that is captured by the first image sensor 4, the actual details of the control that it performs are the same as in the embodiments described above, mutatis mutandis.

The above described embodiments are examples, and various modifications can be made without departing from the scope of the invention.

What is claimed is:

1. An image tracking device, comprising:
   an image sensor that acquires image information in an image field formed by an imaging optical system;
   a tracking subject detector that detects a position of a tracking subject in the image field based upon reference image information related to an image of the tracking subject and the image information acquired by the image sensor;
   an acquisition unit that acquires focal distance information and photographic distance information with regard to the imaging optical system from the imaging optical system; and
   a magnification detector that calculates a magnification of the imaging optical system based upon a ratio of the focal distance information to the photographic distance information acquired by the acquisition unit, wherein
   the tracking subject detector determines whether or not the calculated magnification of the imaging optical system is greater than a predetermined value, starts operation to detect the position of the tracking subject when determining that the calculated magnification of the imaging optical system is greater than the predetermined value, and does not start the operation to detect the position of the tracking subject when determining that the calculated magnification of the imaging optical system is smaller than the predetermined value.

2. The image tracking device according to claim 1, further comprising:
   a reference image information setting circuit that sets information corresponding to the image of the tracking subject within the image information acquired by the image sensor as the reference image information, when the calculated magnification of the imaging optical system is greater than the predetermined value.

3. The image tracking device according to claim 2, further comprising:
   a focus detector that detects focusing states of the imaging optical system for a plurality of focus detection positions that are set within the image field; and
   a position selector that selects one of the plurality of focus detection positions, based upon the focusing states that have been detected for the plurality of focus detection positions, wherein the reference image information setting circuit sets the image information that corresponds to a focus detection position selected by the position selector as the reference image information.

4. The image tracking device according to claim 3, further comprising:
a scene classifier that classifies a scene based upon the image information from the image sensor, wherein
the position selector selects a focus detection position based upon focusing states that have been detected for a plurality of focus detection positions that are positioned in a range corresponding to the scene within the image field.

5. The image tracking device according to claim 3, further comprising:
a person detector that detects a position of a human body within the image field based upon the image information from the image sensor, wherein
the position selector selects a focus detection position based upon focusing states that have been detected for a plurality of focus detection positions that correspond to the position of the human body within the image field.

6. A focusing device, comprising:
an image tracking device according to claim 3;
a position determining circuit that determines the focus detection position to be used for performing focusing of the imaging optical system, based upon the position of the tracking subject detected by the tracking subject detector within the image field, and upon the focusing states for the plurality of focus detection positions that are detected by the focus detector; and
a focusing adjuster that performs focusing of the imaging optical system, based upon the focusing state for the focus detection position that has been determined by the position determining circuit.

7. A focusing device, comprising:
an image tracking device according to claim 4;
a position determining circuit that determines the focus detection position to be used for performing focusing of the imaging optical system, based upon the position of the tracking subject detected by the tracking subject detector within the image field, and upon the focusing states for the plurality of focus detection positions that are detected by the focus detector; and
a focusing adjuster that performs focusing of the imaging optical system, based upon the focusing state for the focus detection position that has been determined by the position determining circuit.

8. A focusing device, comprising:
an image tracking device according to claim 5;
a position determining circuit that determines the focus detection position to be used for performing focusing of the imaging optical system, based upon the position of the tracking subject detected by the tracking subject detector within the image field, and upon the focusing states for the plurality of focus detection positions that are detected by the focus detector; and
a focusing adjuster that performs focusing of the imaging optical system, based upon the focusing state for the focus detection position that has been determined by the position determining circuit.

9. An image-capturing device, comprising a focusing device according to claim 6.

10. An image tracking device, comprising:
an image sensor that acquires image information in an image field formed by an imaging optical system;
a tracking subject detector that detects a position of a tracking subject in the image field based upon reference image information related to an image of the tracking subject and the image information acquired by the image sensor;
an acquisition unit that acquires focal distance information and photographic distance information with regard to the imaging optical system from the imaging optical system; and
a magnification detector that obtains a magnification of the imaging optical system based upon a ratio of the focal distance information to the photographic distance information acquired by the acquisition unit, wherein
the tracking subject detector determines whether or not the obtained magnification of the imaging optical system is greater than a predetermined value, starts operation to detect the position of the tracking subject when determining that the obtained magnification of the imaging optical system is greater than the predetermined value, and does not start the operation to detect the position of the tracking subject when determining that the obtained magnification of the imaging optical system is smaller than the predetermined value.

11. An image tracking device, comprising:
an image sensor that captures an image formed by an imaging optical system;
a control unit that performs a position detection control to detect a position of a tracking subject based upon reference image including information related to the tracking subject and the image captured by the image sensor;
an obtaining unit that obtains a magnification of the imaging optical system based upon a ratio of focal distance information to photographic distance information of the imaging optical system, wherein
the control unit starts the position detection control to detect the position of the tracking subject when determining that the magnification of the imaging optical system obtained by the obtaining unit is greater than a predetermined value, and does not start the position detection control to detect the position of the tracking subject when determining that the magnification of the imaging optical system obtained by the obtaining unit is smaller than the predetermined value.

12. An image-capturing device, comprising:
an image sensor that captures an image formed by an imaging optical system;
a detection unit that detects a position of a tracking subject based upon reference image including information related to the tracking subject and the image captured by the image sensor;
an obtaining unit that obtains a magnification of the imaging optical system based upon a ratio of focal distance information to photographic distance information of the imaging optical system; and
a focus control unit that controls focusing state, wherein the focus control unit controls the focusing state with a focus detection area determined by using the position of the tracking subject when determining that the magnification of the imaging optical system obtained by the obtaining unit is greater than a predetermined value, and does not control the focusing state with the focus detection area determined by using the position of the tracking subject when determining that the magnification of the imaging optical system obtained by the obtaining unit is smaller than the predetermined value.

* * * * *